(12) United States Patent
Hamamoto et al.

(10) Patent No.: US 6,413,677 B1
(45) Date of Patent: Jul. 2, 2002

(54) LITHIUM SECONDARY BATTERY ELECTROLYTE AND LITHIUM SECONDARY BATTERY USING THE SAME

(75) Inventors: Toshikazu Hamamoto; Koji Abe; Tsutomu Takai; Yasuo Matsumori; Kazuhiro Miyoshi; Akira Ueki, all of Ube (JP)

(73) Assignee: UBE Industries, Ltd., Yamaguchi (JP)

( * ) Notice: Subject to any disclaimer, the term of this patent is extended or adjusted under 35 U.S.C. 154(b) by 0 days.

(21) Appl. No.: 09/466,332

(22) Filed: Dec. 17, 1999

(30) Foreign Application Priority Data

Dec. 25, 1998 (JP) ............................................. 10-369434
Jan. 26, 1999 (JP) ............................................. 11-017576

(51) Int. Cl.⁷ .............................................. H01M 10/40

(52) U.S. Cl. ......................... 429/326; 429/340; 429/341

(58) Field of Search ................................ 429/325, 326, 429/340, 341

(56) References Cited

U.S. PATENT DOCUMENTS

| | | | | |
|---|---|---|---|---|
| 5,324,599 A | * | 6/1994 | Oyama et al. | |
| 5,518,841 A | * | 5/1996 | Sotomura et al. | ............ 429/213 |
| 5,571,292 A | * | 11/1996 | Sotomura et al. | ........ 429/213 X |
| 5,580,682 A | * | 12/1996 | Chaloner-Gill | |
| 6,057,056 A | * | 5/2000 | Kim et al. | ................... 429/213 |
| 6,110,619 A | * | 8/2000 | Zhang et al. | ................ 429/213 |

FOREIGN PATENT DOCUMENTS

| | | |
|---|---|---|
| JP | 10-64591 | 3/1998 |
| JP | 10-172604 | 6/1998 |

OTHER PUBLICATIONS

Japanese Patent Abstract corresponding to JP–A–10–64591 (Mar. 1998).

Japanese Patent Abstract corresponding to JP–A–10–172604 (Jun. 1998).

* cited by examiner

*Primary Examiner*—Stephen Kalafut
(74) *Attorney, Agent, or Firm*—Morgan, Lewis & Bockius LLP

(57) ABSTRACT

A lithium secondary battery electrolyte comprising a non-aqueous solvent and a lithium salt dissolved therein, said electrolyte containing at least one compound having the formula (I) or (II):

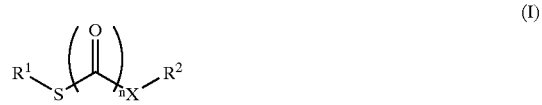

(I)

wherein, $R^1$ and $R^2$ independently indicate, a $C_1$ to $C_{12}$ alkyl group, a $C_3$ to $C_6$ cycloalkyl group, or an aryl group, x indicates an oxygen atom or a sulfur atom, and n indicates an integer of 1 or 2;

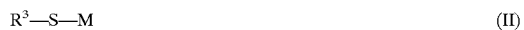

(II)

wherein, $R^3$ indicates a $C_1$ to $C_{15}$ alkyl group or a $C_3$ to $C_{12}$ cycloalkyl group which may be substituted with at least one $C_1$ to $C_4$ alkyl group, a $C_7$ to $C_{15}$ benzyl group which may be substituted with at least one $C_1$ to $C_4$ alkyl group, or a $C_6$ to $C_{15}$ aryl group, which may be substituted with at least one $C_1$ to $C_4$ alkyl group, M indicates an alkali metal, and $R^3$ may be substituted with at least one halogen atom; and a lithium secondary battery using the same.

8 Claims, No Drawings

LITHIUM SECONDARY BATTERY ELECTROLYTE AND LITHIUM SECONDARY BATTERY USING THE SAME

BACKGROUND OF THE INVENTION

1. Field of the Invention

The present invention relates to a novel lithium secondary battery electrolyte capable of providing a lithium secondary battery superior in the battery cycle characteristics and in battery characteristics such as the electric capacity and storage characteristics and to a lithium secondary battery using the same.

2. Description of the Related Art

In recent years, lithium secondary batteries have come into wide use as sources for driving compact electronic devices. A lithium secondary battery is mainly composed of a cathode, a non-aqueous electrolyte, and an anode. In particular, a secondary battery having a lithium complex oxide such as $LiCoO_2$ as its cathode and a carbonaceous material or lithium metal as its anode is preferably used. As the electrolyte for this lithium secondary battery, carbonates such as ethylene carbonate (EC), propylene carbonate (PC) are preferably used.

However, a secondary battery having more superior battery cycle characteristics and battery characteristics such as the electric capacity, is being sought.

In a lithium secondary battery using, for example, $LiCoO_2$, $LiMn_2O_4$, $LiNiO_2$, or the like as the cathode active material, the solvent in the non-aqueous electrolyte is locally partially oxidized and decomposed at the time of charging. The decomposed product inhibits the desirable electrochemical reaction of the battery, and therefore, causes the reduction in the battery performance. This is believed to be due to the electrochemical oxidation of the solvent at the interface of the cathode material and non-aqueous electrolyte.

Further, in a lithium secondary battery using, for example, highly crystallized carbonaceous material such as natural graphite, artificial graphite, as the anode active material, exfoliation of the carbonaceous material is observed. Depending on the extent of the phenomenon, the capacity sometimes becomes irreversible. This exfoliation occurs due to the decomposition of the solvent in the electrolyte at the time of charging and is due to the electrochemical reduction of the solvent at the interface of the carbonaceous anode material and the electrolyte.

Further, in general, a carbonaceous anode has a capacity called an "irreversible capacity" in which part of the lithium inserted in the carbonaceous anode at the time of the first charging will not disassociate at the time of discharging. To prepare a battery of a predetermined capacity, it is necessary to use an excess amount of the cathode active material corresponding to the amount of the irreversible capacity, and therefore, there are the problems that the battery weight becomes heavier by that amount or extra cost is required.

As mentioned above, the battery cycle characteristics and battery characteristics such as the electric capacity are not necessarily satisfactory at the present time.

SUMMARY OF INVENTION

The objects of the present invention are to solve the above-mentioned problems relating to lithium secondary battery electrolytes in the prior art and to provide a lithium secondary battery electrolyte capable of constructing a lithium secondary battery superior in battery cycle characteristics and further superior in battery characteristics such as the electric capacity and storage characteristics in a charged state and a lithium secondary battery using the same.

In accordance with the present invention, there is provided a lithium secondary battery electrolyte comprising a non-aqueous solvent and a lithium salt dissolved therein, said electrolyte containing at least one compound having the formula (I):

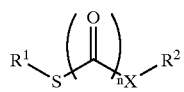

(I)

wherein, $R^1$ and $R^2$ independently indicate, a $C_1$ to $C_{12}$ alkyl group, a $C_3$ to $C_6$. cycloalkyl group, or an aryl group, x indicates an oxygen atom or a sulfur atom, and n indicates an integer of 1 or 2.

In accordance with the present invention, there is also provided a lithium secondary battery comprising a cathode, an anode, and an electrolyte comprising a non-aqueous solvent and a lithium salt dissolved therein, said electrolyte containing at least one compound having the formula (I):

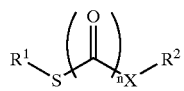

(I)

wherein, $R^1$ and $R^2$ independently indicate, a $C_1$ to $C_{12}$ alkyl group, a $C_3$ to $C_6$ cycloalkyl group, or an aryl group, wherein X indicates an oxygen atom or a sulfur atom, and n indicates an integer of 1 or 2.

In accordance with the present invention, there is further provided a lithium secondary battery electrolyte comprising a non-aqueous solvent and a lithium salt dissolved therein, said electrolyte containing at least one thiol salt having the formula (II):

$$R^3\text{—}S\text{—}M \quad\quad (II)$$

wherein, $R^3$ indicates a $C_1$ to $C_{15}$ alkyl group or a $C_3$ to $C_{12}$ cycloalkyl group which may be substituted with at least one $C_1$ to $C_4$ alkyl group, a $C_7$ to $C_{15}$ benzyl group which may be substituted with at least one $C_1$ to $C_4$ alkyl group, or a $C_6$ to $C_{15}$ aryl group, which may be substituted with at least one $C_1$ to $C_4$ alkyl group, M indicates an alkali metal, and $R^3$ may be substituted with at least one halogen atom.

In accordance with the present invention, there is further provided a lithium secondary battery comprising a cathode, an anode, and a lithium salt comprising a non-aqueous solvent and an electrolyte dissolved therein, said electrolyte containing at least one thiol salt having the formula (II):

$$R^3\text{—}S\text{—}M \quad\quad (II)$$

wherein, $R^3$ indicates a $C_1$ to $C_{15}$ alkyl group or a $C_3$ to $C_{12}$ cycloalkyl group which may be substituted with at least one $C_1$ to $C_4$ alkyl group, a $C_7$ to $C_{15}$ benzyl group which may be substituted with at least one $C_1$ to $C_4$ alkyl group, or a $C_6$ to $C_{15}$ aryl group, which may be substituted with at least one $C_1$ to $C_4$ alkyl group, M indicates an alkali metal, and $R^3$ may be substituted with at least one halogen atom.

DETAILED DESCRIPTION OF PREFERRED EMBODIMENTS

The compound having the general formula (I) contained in the electrolyte is reduced and decomposed before the organic solvent in the electrolyte at the carbon anode surface at the time of charging. Part of the decomposed product forms a passivation film at the carbon anode surface made highly crystalline by activity such as natural graphite or artificial graphite to thereby, it is believed, prevent in advance the reduction and decomposition of the organic solvent in the electrolyte.

Further, part of the decomposed product is oxidized and decomposed before the organic solvent in the electrolyte at the slight overvoltage portion where the potential of the surface of the cathode material becomes excessively high to thereby, it is believed, prevent in advance the oxidation and decomposition of the organic solvent in the electrolyte.

Due to the above phenomina, it is believed that there is the effect of suppressing the decomposition of the electrolyte, without impairing from the normal reaction of the battery.

In the compound contained in the electrolyte composed of a non-aqueous solvent and a lithium salt dissolved therein, the $R^1$ and $R^2$ in the compound having the general formula (I) preferably independently represent a $C_1$ to $C_{12}$ alkyl group such as a methyl group, ethyl group, propyl group, butyl group, pentyl group, and hexyl group. The alkyl group is preferably a branched alkyl group such as an isopropyl group and isobutyl group. Further, the cyclopropyl group may be a $C_3$ to $C_6$ cycloalkyl group such as a cyclohexyl group. Further, it may contain a $C_6$ to $C_{12}$ aryl group such as a phenyl group, benzyl group, or p-tolyl group. Further, X represents an oxygen atom or sulfur atom, wherein n indicates an integer of 1 or 2.

As specific examples of the compound having the general formula (I), for example, when X is an oxygen atom, S-methyl O-methyl thiocarbonate ($R^1$=methyl group, $R^2$=methyl group, n=1), S-ethyl O-methyl thiocarbonate ($R^1$=ethyl group, $R^2$=methyl group, n=1), S-butyl O-methyl thiocarbonate ($R^1$=butyl group, $R^2$=methyl group, n=1), S-cyclohexyl O-methyl thiocarbonate ($R^1$=cyclohexyl group, $R^2$=methyl group, n=1), S-phenyl O-methyl thiocarbonate ($R^1$=phenyl group, $R^2$=methyl group, n=1), S-phenyl O-ethyl thiocarbonate ($R^1$=phenyl group, $R^2$=ethyl group, n=1), S-phenyl O-cyclohexyl thiocarbonate ($R^1$=phenyl group, $R^2$=cyclohexyl group, n=1), S-phenyl O-phenyl thiocarbonate ($R^1$=$R^2$=phenyl group, n=1), S-p-tolyl O-methyl thiocarbonate ($R^1$=p-tolyl group, $R^2$=methyl group, n=1), S-methyl O-methyl thiooxalate ($R^1$=methyl group, $R^2$=methyl group, n=2), S-ethyl O-methyl thiooxalate ($R^1$=ethyl group, $R^2$=methyl group, n=2), S-butyl O-methyl thiooxalate ($R^1$=butyl group, $R^2$=methyl group, n=2), S-cyclohexyl O-methyl thiooxalate ($R^1$=cyclohexyl group, $R^2$=methyl group, n=2), S-phenyl O-methyl thiooxalate ($R^1$=phenyl group, $R^2$=methyl group, n=2), S-phenyl O-ethyl thiooxalate ($R^1$=phenyl group, $R^2$=ethyl group, n=2), S-phenyl O-cyclohexyl thiooxalate ($R^1$=phenyl group, $R^2$-cyclohexyl group, n=2), S-phenyl O-phenyl thiooxalate ($R^1$=$R^2$=phenyl group, n=2), and S-p-tolyl O-methyl thiooxalate ($R^1$=p-tolyl group, $R^2$=methyl group, n=2) may be mentioned.

For example, when X=sulfur atom, S,S-dimethyl dithiocarbonate ($R^1$=methyl group, $R^2$=methyl group, n=1), S-ethyl S-methyl dithiocarbonate ($R^1$=ethyl group, $R^2$=methyl group, n=1), S-butyl S-methyl dithiocarbonate ($R^1$=butyl group, $R^2$=methyl group, n=1), S-cyclohexyl S-methyl dithiocarbonate ($R^1$=cyclohexyl group, $R^2$=methyl group, n=1), S-phenyl S-methyl dithiocarbonate ($R^1$=phenyl group, $R^2$=methyl group, n=1), S-phenyl S-ethyl dithiocarbonate ($R^1$=phenyl group, $R^2$=ethyl group, n=1), S-phenyl S-cyclohexyl dithiocarbonate ($R^1$=phenyl group, $R^2$=cyclohexyl group, n=1), S-phenyl S-phenyl dithiocarbonate ($R^1$=$R^2$=phenyl group, n=1), S-p-tolyl S-methyl dithiocarbonate ($R^1$=p-tolyl group, $R^2$=methyl group, n=1), S-methyl O-methyl dithiooxalate ($R^1$=methyl group, $R^2$=methyl group, n=2), S-ethyl S-methyl dithiooxalate ($R^1$=ethyl group, $R^2$=methyl group, n=2), S-butyl S-methyl dithiooxalate ($R^1$=butyl group, $R^2$=methyl group, n=2), S-cyclohexyl S-methyl dithiooxalate ($R^1$=cyclohexyl group, $R^2$=methyl group, n=2), S-phenyl S-methyl dithiooxalate ($R^1$=phenyl group, $R^2$=methyl group, n=2), S-phenyl S-ethyl dithiooxalate ($R^1$=phenyl group, $R^2$=ethyl group, n=2), S-phenyl S-cyclohexyl dithiooxalate ($R^1$=phenyl group, $R^2$=cyclohexyl group, n=2), S-phenyl S-phenyl dithiooxalate ($R^1$=$R^2$=phenyl group, n=2), S-p-tolyl S-methyl dithiooxalate ($R^1$=p-tolyl group, $R^2$=methyl group, n=2) may be mentioned. The present invention, however, is not limited to these compounds in any way.

In the compound, if the content of the compound having the general formula (I) is too large, the electroconductivity etc. of the electrolyte changes and the battery performance falls in some cases. Further, if too small, a sufficient film will not be formed and the anticipated battery properties cannot be obtained. Therefore, the content is preferably in the range of 0.01 to 10% by weight, more preferably 0.02 to 8% by weight, particularly 0.1 to 5% by weight, based upon the weight of the electrolyte.

The compound (II) contained in the electrolyte is believed to be oxidized at the cathode surface at the time of charging to form a passivative film at the cathode surface and suppress the oxidation and decomposition of the electrolyte on the cathode and thereby improve the cycle characteristics and storage characteristics of the battery. Further, electrons are discharged when the compound (II) contained in the electrolyte is oxidized on the cathode, and therefore, those electrons can be used for storage of $M^+$ at the anode side and thus a battery with a higher capacity than one in the case of an electrolyte not containing the compound (II) can be fabricated.

In the compound contained in the electrolyte composed of a non-aqueous solvent and a lithium salt contained therein, the $R^3$ in the compound having the general formula (II) represents a $C_1$ to $C_{15}$ alkyl group or a $C_3$ to $C_{12}$ cycloalkyl group which may be substituted with at least one $C_1$ to $C_4$ alkyl group, a $C_7$ to $C_{15}$ benzyl group which may be substituted with at least one $C_1$ to $C_4$ alkyl group, or $C_6$ to $C_{15}$ aryl group which may be substituted with at least one $C_1$ to $C_4$ alkyl group, and M represents an alkali metal. Further, $R^3$ may be substituted with at least one halogen atom selected from the group consisting of fluorine, chlorine, bromine, and iodine.

As the $C_1$ to $C_{15}$ alkyl group, a $C_1$ to $C_{15}$ linear or branched alkyl group such as a methyl group, ethyl group, propyl group, iso-propyl group, n-butyl group, iso-butyl group, or tert-butyl group or alkyl group substituted with a halogen atom such as a 3-chloropropyl group, 3-bromopropyl group, 3-fluoropropyl group, or 4-chloro-n-butyl group may be mentioned.

Further, a $C_3$ to $C_{12}$ cycloalkyl group such as a cyclopropyl group, cyclobutyl group, cyclopentyl group, cyclohexyl group, cyclooctyl group, or cyclododecyl group or a $C_3$ to $C_{12}$ cycloalkyl group with at least one hydrogen atom on the cycloalkyl ring substituted with a $C_1$ to $C_4$ alkyl group or halogen atom such as a 4-methylcyclohexyl group, 4-chlorocyclohexyl group, 4-bromocyclohexyl group, or 4-fluorocyclohexyl group may be mentioned.

Further, a benzyl group or a $C_7$ to $C_{15}$ benzyl group with at least one hydrogen atom on the benzene ring substituted with a $C_1$ to $C_4$ alkyl group or halogen atom such as a 4-methylbenzyl group, 4-chlorobenzyl group, 4-bromobenzyl group, or 4-fluorobenzyl group may be mentioned.

Further, an aryl group such as a phenyl group or naphthyl group or a $C_6$ to $C_{15}$ aryl group with at least one hydrogen atom on the benzene ring or naphthalene ring substituted with a $C_1$ to $C_4$ alkyl group or halogen group such as a p-tosyl group, 4-chlorophenyl group, 4-bromophenyl group, 4-fluorophenyl group, 2-methylnaphthyl group, 2-chloronaphthyl group, 2-bromonaphthyl group, or 2-fluoronaphthyl group may be mentioned.

M may be Na, K, Li, etc. In particular, Li is preferable since it is the basest metal element electrochemically.

As specific examples of the compound having the formula (II), lithium methanethiolate, lithium ethanethiolate, lithium n-propanethiolate, lithium 1-methylethanethiolate, lithium n-butanethiolate, lithium 2-methylpropanethiolate, lithium 1,1-dimethylethanethiolate, lithium 2,2-dimethylpropanethiolate, lithium pentanethiolate, lithium hexanethiolate, lithium heptanethiolate, lithium octanethiolate, lithium decanethiolate, lithium dodecanethiolate, lithium 3-chloro-n-propanethiolate, lithium 3-bromo-n-propanethiolate, lithium 3-fluoro-n-propanethiolate, lithium 4-chloro-n-butanethiolate, sodium butanethiolate, potassium butanethiolate, lithium cyclopentanethiolate, lithium cyclohexanethiolate, lithium cycloheptanethiolate, lithium cyclooctanethiolate, lithium cyclodecanethiolate, lithium cyclododecanethiolate, lithium 4-methylcyclohexanethiolate, lithium 4-chlorocyclohexanethiolate, lithium 4-bromocyclohexanethiolate, lithium 4-fluorocyclohexanethiolate, sodium cyclohexanethiolate, potassium cyclohexanethiolate, lithium phenylmethanethiolate ($C_6H_5CH_2$-S-Li), lithium 4-methylphenylmethanethiolate (4-$CH_3$-$C_6H_4CH_2$-S-Li ), lithium 4-chlorophenylmethanethiolate, lithium 4-bromophenylmethanethiolate, lithium 4-fluorophenylmethanethiolate, sodium phenylmethanethiolate, potassium phenylmethanethiolate, lithium benzenethiolate, lithium 2-methylbenzenethiolate, lithium 3-methylbenzenethiolate, lithium 4-methylbenzenethiolate, lithium 2,4-dimethylbenzenethiolate, lithium 2,5-dimethylbenzenethiolate, lithium 2,6-dimethylbenzenethiolate, lithium 3,4-dimethylbenzenethiolate, lithium 3,5-dimethylbenzenethiolate, lithium 2-ethylbenzenethiolate, lithium 2-iso-propylbenzenethiolate, sodium benzenethiolate, sodium 2-methylbenzenethiolate, sodium 3-methylbenzenethiolate, sodium 4-methylbenzenethiolate, potassium benzenethiolate, potassium 2-methylbenzenethiolate, potassium 3-methylbenzenethiolate, potassium 4-methylbenzenethiolate, lithium 4-chlorobenzenethiolate, lithium 4-bromobenzenethiolate, lithium 4-fluorobenzenethiolate, lithium naphthalenethiolate, lithium 2-methyl-1-naphthalenethiolate, lithium 2-chloro-1-naphthalenethiolate, lithium 2-bromo-1-naphthalenethiolate, lithium 2-fluoro-1-naphthalenethiolate, sodium naphthalenethiolate, potassium naphthalenethiolate, etc. may be mentioned.

The present invention, however, is not limited to these compounds in any way.

In the compound, if the content of the compound of formula (II) is too large, the passivative film formed on the cathode surface becomes too thick, movement of Li ions is inhibited, the battery performance falls or the electroconductivity etc. of the electrolyte changes and the battery performance falls in some cases. Further, if too small, a sufficient film is not formed and the anticipated battery properties cannot be obtained. Therefore, the content is preferably in the range of 0.01 to 10% by weight, particularly 0.05 to 5% by weight, based upon the weight of the electrolyte.

The non-aqueous solvents usable in the present invention preferably include high dielectric constant solvents and low viscosity solvents.

As a high dielectric constant solvent, for example, a cyclic carbonate such as ethylene carbonate (EC), propylene carbonate (PC), or butylene carbonate (BC) may be suitably mentioned. These high dielectric constant solvents may be used alone or any combinations thereof.

As the low viscosity solvent, for example, a linear carbonate such as dimethyl carbonate (DMC), methylethyl carbonate (MEC), or diethyl carbonate (DEC), an ether such as tetrahydrofuran, 2-methyltetrahydrofuran, 1,4-dioxane, 1,2-dimethoxyethane, 1,2-diethoxyethane, or 1,2-dibutoxyethane, a lactone such as γ-butyrolactone, a nitrile such as acetonitrile, an ester such as methyl propionate, and an amide such as dimethylformamide may be mentioned. These low viscosity solvents may be used alone or any combinations thereof.

Any of the high dielectric constant solvents and the low viscosity solvents are selected and combined for use. Note that the high dielectric constant solvent and the low viscosity solvent are used in a volume ratio (high dielectric constant solvent:low viscosity solvent) of preferably 1:9 to 4:1, more preferably 1:4 to 7:3.

As the lithium salt usable in the present invention, for example, $LiPF_6$, $LiBF_4$, $LiClO_4$, $LiN(SO_2CF_3)_2$, $LiN(So_2C_2F_5)_2$, $LiC(SO_2CF_3)_3$, etc. may be mentioned. These lithium salts may be used alone or any combinations thereof. These lithium salts are used added to the non-aqueous solvent in a concentration of preferably 0.1 to 3M, more preferably 0.5 to 1.5M.

The electrolyte of the present invention is obtained by, for example, mixing the above high dielectric constant solvents or low viscosity solvents, adding the lithium salt to the resultant solution, then dissolving at least one compound having the general formula (I) or (II) therein.

The electrolyte of the present invention is suitably used as a component of a secondary battery, in particular the component of a lithium secondary battery. The components other than the electrolyte constituting the secondary battery are not particularly limited. Various components used in the prior art may be used.

For example, as the cathode active material, a complex metal oxide of at least one type of metal selected from the group comprising cobalt, manganese, nickel, chromium, iron, and vanadium with lithium is used. As such a complex metal oxide, for example, $LiCoO_2$, $LiMn_2O_4$, $LiNiO_2$, etc. may be mentioned.

The cathode is prepared by mixing the cathode active material with a conductive agent such as acetylene black or carbon black and a binder such as polytetrafluoroethylene (PTFE) and polyvinylidene fluoride (PVDF) and 1-methyl-2-pyrrolidine to make a cathode paste, then coating (or pressing) this cathode material on aluminum foil or stainless steel foil or lath serving as a collector, followed by drying, pressing, and heating the same at a temperature of about 50 to 250° C. for, for example, about 2 hours under a vacuum.

As the anode active material, a lithium metal or lithium alloy and a carbonaceous material having a graphite-type crystal structure capable of intercalate-disintercalate lithium (pyrolyric carbons, coke, graphite (or artificial graphite, natural graphite, etc.), organic polymer compound sintered fines, carbon fiber), complex tin oxides, and other substances are used. In particular, a carbonaceous material having a graphite-type crystal structure having a lattice spacing ($d_{002}$) of a lattice plane (002) of 0.335 to 0.340 nm (nanometers) is preferably used. Note that a powder material such as a carbonaceous material is kneaded with a binder such as ethylene propylene diene terpolymer (EPDM), polytetrafluoroethylene (PTFE), and polyvinylidene fluoride (PVDF) for use as an anode paste.

The configuration of the lithium secondary battery is not particularly limited. A coin battery having a cathode, anode, and single or double layer separator or a cylindrical battery, prismatic battery, etc. having a cathode, anode, and roll-like separator may be mentioned as examples. Note that as the separator, a known polyolefin microporous membrane, woven fabric, nonwoven fabric, etc. may be used.

EXAMPLES

The present invention will now be further explained in detail, but is by no means limited to, the following Examples and Comparative Examples.

Example 1

Preparation of Electrolyte

A non-aqueous solvent of EC-DMC (volume ratio)=1:2 was prepared. $LiPF_6$ was dissolved therein to a concentration of 1M, then S-phenyl O-methyl thiooxalate was added to the electrolyte to a concentration of 0.2% by weight.

Fabrication of Lithium Secondary Battery and Measurement of Battery Characteristics 80% by weight of $LiCoO_2$ (cathode active material), 10% by weight of acetylene black (conductive agent), and 10% by weight of polyvinylidene fluoride (binder) were mixed and diluted by 1-methyl-2-pyrrolidone to prepare a slurry which was then coated on aluminum foil. This was then dried and compression molded to form the cathode. 90% by weight of natural graphite (anode active material) and 10% by weight of polyvinylidene fluoride (binder) were mixed and diluted with 1-methyl-2-pyrrolidone to prepare a slurry which was then coated on copper foil. Next, this was dried and compression molded to form the anode. A separator made of a polypropylene microporous film was then used and the electrolyte filled to prepare a coin battery (diameter 20 mm, thickness 3.2 mm).

This coin battery was charged at room temperature (20° C.) by a constant current of 0.8 mA and a constant voltage to an upper limit voltage of 4.2V for 5 hours, then discharged by a constant current of 0.8 mA to a discharging voltage of 2.7V. This charge and discharge operation was repeated. The initial discharge capacity was calculated as a relative capacity compared with the case of use of 1M $LiPF_6$ EC/DMC (volume ratio)=1/2 as the electrolyte (Comparative Example 1). The relative capacity of the initial discharge capacity was 1.02. The battery characteristics were measured after 50 cycles, whereupon the discharge capacity retention rate indexed to the initial discharge capacity as 100% was 92.4%. Further, the low temperature characteristics were also good. The conditions for fabrication of the coin battery and the battery characteristics are shown in Table 1.

Example 2

The same procedure was followed as in Example 1, except for using 3.0% by weight of S-phenyl O-methyl thiooxalate in the electrolyte, to prepare a coin battery. The relative capacity of the initial discharge capacity was 1.01. The battery characteristics after 50 cycles were measured, whereupon the discharge capacity retention rate was 90.3%. The conditions for fabrication of the coin battery and the battery characteristics are shown in Table 1.

Example 3

The same procedure was followed as in Example 1, except for using 8.0% by weight of S-phenyl O-methyl thiooxalate in the electrolyte, to prepare a coin battery. The relative capacity of the initial discharge capacity was 0.98. The battery characteristics after 50 cycles were measured, whereupon the discharge capacity retention rate was 86.2%. The conditions for fabrication of the coin battery and the battery characteristics are shown in Table 1.

Example 4

The same procedure was followed as in Example 1, except for using 0.02% by weight of S-phenyl O-methyl thiooxalate in the electrolyte, to prepare a coin battery. The relative capacity of the initial discharge capacity was 1.0. The battery properties after 50 cycles were measured, whereupon the discharge capacity retention rate was 87.6%. The conditions for fabrication of the coin battery and the battery characteristics are shown in Table 1.

Example 5

The same procedure was followed as in Example 1, except for using 0.2% by weight of S-phenyl O-methyl thiocarbonate in the electrolyte and using MEC instead of DMC, to prepare a coin battery. The relative capacity of the initial discharge capacity was 1.01. The battery characteristics after 50 cycles were measured, whereupon the discharge capacity retention rate was 90.7%. The conditions for fabrication of the coin battery and the battery characteristics are shown in Table 1.

Example 6

The same procedure was followed as in Example 5, except for using 0.2% by weight of S,S-diphenyl dithiooxalate in the electrolyte, to prepare a coin battery. The relative capacity of the initial discharge capacity was 1.03. The battery characteristics after 50 cycles were measured, whereupon the discharge capacity retention rate was 92.1%. The conditions for fabrication of the coin battery and the battery characteristics are shown in Table 1.

Example 7

The same procedure was followed as in Example 5, except for using 0.2% by weight of S,S-diphenyl dithiocarbonate in the electrolyte, to prepare a coin battery. The relative capacity of the initial discharge capacity was 1.03. The battery characteristics after 50 cycles were measured, whereupon the discharge capacity retention rate was 91.6%. The conditions for fabrication of the coin battery and the battery characteristics are shown in Table 1.

Example 8

The same procedure was followed as in Example 1, except for using 0.2% by weight of S,S-diphenyl dithiooxalate in the electrolyte and using a non-aqueous solution of PC/EC/MEC (volume ratio)=1/1/2 to prepare a coin battery. The relative capacity of the initial discharge capacity was 1.01. The battery characteristics after 50 cycles were measured, whereupon the discharge capacity retention rate was 92.5%. The low temperature characteristics were also good. The conditions for fabrication of the coin battery and the battery characteristics are shown in Table 1.

Example 9

The same procedure was followed as in Example 1, except for using $LiMn_2O_4$ instead of $LiCoO_2$ as the cathode active material and using 0.2% by weight of S-phenyl O-methyl thiooxalate in the electrolyte, to prepare a coin battery. The relative capacity of the initial discharge capacity was 0.82. The battery characteristics after 50 cycles were measured, whereupon the discharge capacity retention rate was 93.1%. The conditions for fabrication of the coin battery and the battery characteristics are shown in Table 1.

Example 10

The same procedure was followed as in Example 1, except for using $LiCo_{0.1}Ni_{0.9}O_2$ instead of $LiCoO_2$ as the cathode active material, to prepare a coin battery. The relative capacity of the initial discharge capacity was 1.20. The battery properties after 50 cycles were measured, whereupon the discharge capacity retention rate was 91.4%. The conditions for fabrication of the coin battery and the battery characteristics are shown in Table 1.

Example 11

The same procedure was followed as in Example 1, except for using artificial graphite instead of natural graphite for the anode active material, to prepare a coin battery. The relative capacity of the initial discharge capacity was 1.05. The battery characteristics after 50 cycles were measured, whereupon the discharge capacity retention rate was 92.8%. The conditions for fabrication of the coin battery and the battery characteristics are shown in Table 1.

Comparative Example 1

A non-aqueous solvent of EC/DMC (volume ratio)=1/2 was prepared. $LiPF_6$ was dissolved in this to a concentration of 1M. At this time, no compound (I) at all was added. The same procedure was followed as in Example 1 using this electrolyte to prepare a coin battery. The relative capacity of the initial discharge capacity in this case was 1. The discharge capacity retention rate after 50 cycles was 83.8% with respect to the initial discharge capacity. The conditions for fabrication of the coin battery and the battery characteristics are shown in Table 1.

TABLE 1

| | Cathode | Anode | Compound | Amount added wt % | Electrolyte composition (volume ratio) | Initial discharge capacity (relative value %) | 50 cycle discharge capacity retention rate % |
|---|---|---|---|---|---|---|---|
| Ex. 1 | $LiCoO_2$ | Natural graphite | S-phenyl O-methyl thiooxalate | 0.2 | 1M $LiPF_6$ EC/DMC = 1/2 | 1.02 | 92.4 |
| Ex. 2 | $LiCoO_2$ | Natural graphite | S-phenyl O-methyl thiooxalate | 3.0 | 1M $LiPF_6$ EC/DMC = 1/2 | 1.01 | 90.3 |
| Ex. 3 | $LiCoO_2$ | Natural graphite | S-phenyl O-methyl thiooxalate | 8.0 | 1M $LiPF_6$ EC/DMC = 1/2 | 0.98 | 86.2 |
| Ex. 4 | $LiCoO_2$ | Natural graphite | S-phenyl O-methyl thiooxalate | 0.02 | 1M $LiPF_6$ EC/DMC = 1/2 | 1 | 87.6 |
| Ex. 5 | $LiCoO_2$ | Natural graphite | S-phenyl O-methyl thiocarbonate | 0.2 | 1M $LiPF_6$ EC/MEC = 1/2 | 1.01 | 90.7 |
| Ex. 6 | $LiCoO_2$ | Natural graphite | S,S-diphenyl dithiooxalate | 0.2 | 1M $LiPF_6$ EC/MEC = 1/2 | 1.03 | 92.1 |
| Ex. 7 | $LiCoO_2$ | Natural graphite | S,S-diphenyl dithiocarbonate | 0.2 | 1M $LiPF_6$ EC/MEC = 1/2 | 1.03 | 91.6 |
| Ex. 8 | $LiCoO_2$ | Natural graphite | S,S-diphenyl dithiooxalate | 0.2 | 1M $LiPF_6$ EC/PC/MEC = 1/1/2 | 1.01 | 92.5 |
| Ex. 9 | $LiMn_2O_4$ | Natural graphite | S-phenyl O-methyl thiooxalate | 0.2 | 1M $LiPF_6$ EC/DMC = 1/2 | 0.82 | 93.1 |
| Ex. 10 | $LiCo_{0.1}Ni_{0.9}O_2$ | Natural graphite | S-phenyl O-methyl thiooxalate | 0.2 | 1M $LiPF_6$ EC/DMC = 1/2 | 1.20 | 91.4 |
| Ex. 11 | $LiCoO_2$ | Artificial graphite | S-phenyl O-methyl thiooxalate | 0.2 | 1M $LiPF_6$ EC/DMC = 1/2 | 1.05 | 92.8 |
| Comp. Ex. 1 | $LiCoO_2$ | Natural graphite | None | 0.0 | 1M $LiPF_6$ EC/DMC = 1/2 | 1 | 83.8 |

Example 12

Preparation of Electrolyte

A non-aqueous solvent of EC-DMC (volume ratio)=1:2 was prepared. $LiPF_6$ was dissolved therein to a concentration of 1M, then lithium benzenethiolate was added to form an electrolyte having a concentration of 0.20% by weight.

Fabrication of Lithium Secondary Battery and Measurement of Battery Characteristics 80% by weight of $LiCoO_2$ (cathode active material), 10% by weight of acetylene black (conductive agent), and 10% by weight of polyvinylidene fluoride (binder) were mixed and diluted with 1-methyl-2-pyrrolidone solvent to prepare a slurry which was then coated on aluminum foil. This was then dried, compression molded, and heated to form the cathode. 90% by weight of natural graphite (anode active material) and 10% by weight of polyvinylidene fluoride (binder) were mixed and diluted with 1-methyl-2-pyrrolidone solvent to prepare a slurry which was then coated on copper foil. Next, this was dried, compression molded, and heated to form the anode. A separator made of a polypropylene microporous film was then used and the electrolyte filled to prepare a coin battery (diameter 20 mm, thickness 3.2 mm).

This coin battery was charged at room temperature (20° C.) by a constant current of 0.8 mA and a constant voltage to an upper limit voltage of 4.2V for 5 hours, then discharged by a constant current of 0.8 mA to a discharging voltage of 2.7V. This charge and discharge operation was repeated. The initial discharge capacity was calculated as a relative capacity compared with the case of use of EC/DMC (volume ratio)=1/2 not given a thiol salt and having $LiPF_6$ dissolved to a concentration of 1M as the lithium salt (Comparative Example 2). The relative capacity of the initial discharging capacity was 1.08. An increase of the discharge capacity of 8% was observed compared with the case of Comparative Example 2. The battery characteristics were measured after 50 cycles, whereupon the discharge capacity retention rate indexed to the initial discharge capacity as 100% was 92.4%. Further, the low temperature characteristics were also good. The conditions for fabrication of the coin battery and the battery characteristics are shown in Table 2.

Example 13

The same procedure was followed as in Example 12, except for using 0.1% by weight of lithium benzenethiolate in the electrolyte, to prepare an electrolyte and fabricate a coin battery and to measure the battery characteristics. The relative capacity of the initial discharge capacity was 1.04. An increase of the discharge capacity of 4% compared with the case of no addition of a thiol salt (Comparative Example 2) was recognized. The battery characteristics after 50 cycles were measured, whereupon the discharge capacity retention rate was 92.1%. The conditions for fabrication of the coin battery and the battery characteristics are shown in Table 2.

Example 14

The same procedure was followed as in Example 12, except for using 0.05% by weight of lithium benzenethiolate in the electrolyte, to prepare an electrolyte and fabricate a coin battery and to measure the battery characteristics. The relative capacity of the initial discharge capacity was 1.02. An increase of the discharge capacity of 2% compared with the case of no addition of a thiol salt (Comparative Example 2) was recognized. The battery characteristics after 50 cycles were measured, whereupon the discharge capacity retention rate was 90.4%. The conditions for fabrication of the coin battery and the battery characteristics are shown in Table 2.

Example 15

The same procedure was followed as in Example 12, except for using 0.2% by weight of lithium 4-methylbenzenethiolate in the electrolyte instead of lithium benzenethiolate, to prepare an electrolyte and fabricate a coin battery and to measure the battery characteristics. The relative capacity of the initial discharge capacity was 1.07. An increase of the discharge capacity of 7% compared with the case of no addition of a thiol salt (Comparative Example 2) was recognized. The battery characteristics after 50 cycles were measured, whereupon the discharge capacity retention rate was 92.7%. The conditions for fabrication of the coin battery and the battery characteristics are shown in Table 2.

Example 16

The same procedure was followed as in Example 12, except for using 0.2% by weight of lithium 4-chlorobenzenethiolate instead of the lithium benzenethiolate in the electrolyte, to prepare an electrolyte and fabricate a coin battery and to measure the battery characteristics. The relative capacity of the initial discharge capacity was 1.06. An increase of the discharge capacity of 6% compared with the case of no addition of a thiol salt (Comparative Example 2) was recognized. The battery characteristics after 50 cycles were measured, whereupon the discharge capacity retention rate was 91.5%. The conditions for fabrication of the coin battery and the battery characteristics are shown in Table 2.

Example 17

The same procedure was followed as in Example 12, except for using 0.2% by weight of sodium benzenethiolate instead of the lithium benzenethiolate in the electrolyte, to prepare an electrolyte and fabricate a coin battery and to measure the battery characteristics. The relative capacity of the initial discharge capacity was 1.07. An increase of the discharge capacity of 7% compared with the case of no addition of a thiol salt (Comparative Example 2) was recognized. The battery characteristics after 50 cycles were measured, whereupon the discharge capacity retention rate was 91.3%. The conditions for fabrication of the coin battery and the battery characteristics are shown in Table 2.

Example 18

The same procedure was followed as in Example 12, except for using 0.1% by weight of lithium butanethiolate instead of the lithium benzenethiolate in the electrolyte, to prepare an electrolyte and fabricate a coin battery and to measure the battery characteristics. The relative capacity of the initial discharge capacity was 1.05. An increase of the discharge capacity of 5% compared with the case of no addition of a thiol salt (Comparative Example 2) was recognized. The battery characteristics after 50 cycles were measured, whereupon the discharge capacity retention rate was 91.1%. The conditions for fabrication of the coin battery and the battery characteristics are shown in Table 2.

Comparative Example 2

A non-aqueous solvent of EC/DMC (volume ratio)=1/2 was prepared. $LiPF_6$ was dissolved in this to a concentration of 1M. At this time, no thiol salt at all was added. The same procedure was followed as in Example 12 using this electrolyte to prepare a coin battery and to measure the battery characteristics. The relative capacity of the initial discharge capacity in this case was 1 in comparison with Examples 12 to 7. The discharge capacity retention rate after 50 cycles was 83.8% with respect to the initial discharge capacity. The conditions for fabrication of the coin battery and the battery characteristics are shown in Table 2.

TABLE 2

| | Cathode | Anode | Additive | Amount added wt % | Electrolyte composition (non-aqueous solvent volume ratio) | Initial discharge relative capacity | 50 cycle discharge capacity retention rate % |
|---|---|---|---|---|---|---|---|
| Ex. 12 | LiCoO$_2$ | Natural graphite | Lithium benzene-thiolate | 0.20 | 1M LiPF$_6$ EC/DMC = 1/2 | 1.08 | 92.4 |
| Ex. 13 | LiCoO$_2$ | Natural graphite | Lithium benzene-thiolate | 0.10 | 1M LiPF$_6$ EC/DMC = 1/2 | 1.04 | 92.1 |
| Ex. 14 | LiCoO$_2$ | Natural graphite | Lithium benzene-thiolate | 0.05 | 1M LiPF$_6$ EC/DMC = 1/2 | 1.02 | 90.4 |
| Ex. 15 | LiCoO$_2$ | Natural graphite | Lithium 4-methyl benzene-thiolate | 0.20 | 1M LiPF$_6$ EC/DMC = 1/2 | 1.07 | 92.7 |
| Ex. 16 | LiCoO$_2$ | Natural graphite | Lithium 4-chloro benzene-thiolate | 0.20 | 1M LiPF$_6$ EC/DMC = 1/2 | 1.06 | 91.5 |
| Ex. 17 | LiCoO$_2$ | Natural graphite | Sodium benzene-thiolate | 0.20 | 1M LiPF$_6$ EC/DMC = 1/2 | 1.07 | 91.3 |
| Ex. 18 | LiCoO$_2$ | Natural graphite | Lithium butane-thiolate | 0.10 | 1M LiPF$_6$ EC/DMC = 1/2 | 1.05 | 91.1 |
| Comp. Ex. 2 | LiCoO$_2$ | Natural graphite | None | 0 | 1M LiPF$_6$ EC/DMC = 1/2 | 1 | 83.8 |

Example 19

The same procedure was followed as in Example 12, except for using artificial graphite instead of natural graphite as the anode active material, to prepare an electrolyte and fabricate a coin battery and to measure the battery characteristics. The initial discharge capacity was compared with the case of the same electrode configuration but with use of EC/DMC (volume ratio)=1/2 not given a thiol salt and having LiPF$_6$ dissolved therein to a concentration of 1M (Comparative Example 2) and calculated as a relative capacity of the same, whereby 1.07 was obtained. An increase of the discharge capacity of 7% compared with the case of natural graphite as the anode active material, to fabricate a coin battery and to measure the battery characteristics. The relative capacity of the initial discharge capacity in this case was made 1 in comparison with Example 19. The discharge capacity retention rate after 50 cycles was 82.7% compared with the initial discharge capacity. The conditions for fabrication of the coin battery and the battery characteristics are shown in Table 3.

Comparative Example 3 was recognized. The battery characteristics after 50 cycles were measured, whereupon the discharge capacity retention rate was 90.1%. The conditions for fabrication of the coin battery and the battery characteristics are shown in Table 3.

Comparative Example 3

The same procedure was followed as in Comparative Example 2, except for using artificial graphite instead of

TABLE 3

| | Cathode | Anode | Additive | Amount added wt % | Electrolyte composition (non-aqueous solvent volume ratio) | Initial discharge relative capacity | 50 cycle discharge capacity retention rate % |
|---|---|---|---|---|---|---|---|
| Ex. 19 | LiCoO$_2$ | Artificial graphite | Lithium benzene-thiolate | 0.20 | 1M LiPF$_6$ EC/DMC = 1/2 | 1.07 | 90.1 |
| Comp. Ex. 3 | LiCoO$_2$ | Artificial graphite | None | 0 | 1M LiPF$_6$ EC/DMC = 1/2 | 1 | 82.7 |

Example 20

The same procedure was followed as in Example 12, except for using LiNi$_{0.8}$Co$_{0.2}$O$_2$ instead of LiCoO$_2$, as the cathode active material, to prepare an electrolyte and fabricate a coin battery and to measure the battery characteristics. The initial discharge capacity was compared with the case of the same electrode configuration but with use of EC/DMC (volume ratio)=1/2 not given a thiol salt and having LiPF$_6$ dissolved therein to a concentration of 1M (Comparative Example 4) and calculated as a relative capacity of the same, whereby 1.06 was obtained. An increase of the discharge capacity of 6% compared with the case of Comparative Example 4 was recognized. The battery characteristics after 50 cycles were measured, whereupon the discharge capacity retention rate was 91.5%. The conditions for fabrication of the coin battery and the battery characteristics are shown in Table 4.

Comparative Example 4

The same procedure was followed as in Comparative Example 2, except for using $LiNi_{0.8}Co_{0.2}O_2$ instead of $LiCoO_2$ as the cathode active material, to fabricate a coin battery and to measure the battery characteristics. The relative capacity of the initial discharge capacity in this case was made 1 in comparison with Example 20. The discharge capacity retention rate after 50 cycles was 84.5% compared with the initial discharge capacity. The conditions for fabrication of the coin battery and the battery characteristics are shown in Table 4.

measured, whereupon the discharge capacity retention rate was 91.9%. The conditions for fabrication of the coin battery and the battery characteristics are shown in Table 5.

Comparative Example 5

The same procedure was followed as in Comparative Example 2, except for using $LiMn_2O_4$ instead of $LiCoO_2$ as the cathode active material, to fabricate a coin battery and to measure the battery characteristics. The relative capacity of the initial discharge capacity in this case was made 1 in comparison with Example 21. The discharge capacity retention rate after 50 cycles was 82.6% compared with the initial discharge capacity. The conditions for fabrication of the coin battery and the battery characteristics are shown in Table 5.

TABLE 4

| | Cathode | Anode | Additive | Amount added wt % | Electrolyte composition (non-aqueous solvent volume ratio) | Initial discharge relative capacity | 50 cycle discharge capacity retention rate % |
|---|---|---|---|---|---|---|---|
| Ex. 20 | $LiNi_{0.8}Co_{0.2}O_2$ | Natural graphite | Lithium benzene-thiolate | 0.20 | 1M $LiPF_6$ EC/DMC = 1/2 | 1.06 | 91.5 |
| Comp. Ex. 4 | $LiNi_{0.8}Co_{0.2}O_2$ | Natural graphite | None | 0 | 1M $LiPF_6$ EC/DMC = 1/2 | 1 | 84.5 |

TABLE 5

| | Cathode | Anode | Additive | Amount added wt % | Electrolyte composition (non-aqueous solvent volume ratio) | Initial discharge relative capacity | 50 cycle discharge capacity retention rate % |
|---|---|---|---|---|---|---|---|
| Ex. 21 | $LiMn_2O_4$ | Natural graphite | Lithium benzene-thiolate | 0.20 | 1M $LiPF_6$ EC/DMC = 1/2 | 1.11 | 91.9 |
| Comp. Ex. 5 | $LiMn_2O_4$ | Natural graphite | None | 0 | 1M $LiPF_6$ EC/DMC = 1/2 | 1 | 82.6 |

Example 21

The same procedure was followed as in Example 12, except for using $LiMnO_4$ instead of $LiCoO_2$ as the cathode active material, to prepare an electrolyte and fabricate a coin battery and to measure the battery characteristics. The initial discharge capacity was compared with the case of the same electrode configuration but with use of EC/DMC (volume ratio)=1/2 not given a thiol salt and having $LiPF_6$ dissolved therein to a concentration of 1M (Comparative Example 5) and calculated as a relative capacity of the same, whereby 1.11 was obtained. An increase of the discharge capacity of 11% compared with the case of Comparative Example 5 was recognized. The battery characteristics after 50 cycles were

Example 22

The same procedure was followed as in Example 12, except for using EC/PC/MEC (volume ratio)=1/1/4 instead of EC/DMC (volume ratio)=1/2 as the non-aqueous solvent, to prepare an electrolyte and fabricate a coin battery and to measure the battery characteristics. The initial discharge capacity was compared with the case of the same non-aqueous solvent but with use of EC/PC/MEC (volume ratio)=1/1/4 not given a thiol salt and having $LiPF_6$ dissolved therein to a concentration of 1M (Comparative Example 6) and calculated as a relative capacity of the same, whereby 1.08 was obtained. An increase of the discharge capacity of 8% compared with the case of Comparative Example 6 was recognized. The battery properties after 50 cycles were measured, whereupon the discharge capacity retention rate was 91.3%. The conditions for fabrication of the coin battery and the battery characteristics are shown in Table 6.

Comparative Example 6

The same procedure was followed as in Comparative Example 2, except for using EC/PC/MEC (volume ratio)= 1/1/4 instead of EC/DMC (volume ratio)=1/2 as the non-aqueous solvent, to fabricate a coin battery and to measure the battery characteristics. The relative capacity of the initial discharge capacity in this case was made 1 in comparison with Example 22. The discharge capacity retention rate after 50 cycles was 81.4% compared with the initial discharge capacity. The conditions for fabrication of the coin battery and the battery characteristics are shown in Table 6.

Example 7 was recognized. The battery characteristics after 50 cycles were measured, whereupon the discharge capacity retention rate was 92.1%. The conditions for fabrication of the coin battery and the battery characteristics are shown in Table 7.

Comparative Example 7

The same procedure was followed as in Comparative Example 2, except for using EC/DMC/DEC (volume ratio)= 1/1/1 instead of EC/DMC (volume ratio)=1/2 as the non-aqueous solvent, to fabricate a coin battery and to measure the battery characteristics. The relative capacity of the initial discharge capacity in this case was made 1 in comparison with Example 23. The discharge capacity retention rate after 50 cycles was 83.0% compared with the initial discharge capacity. The conditions for fabrication of the coin battery and the battery characteristics are shown in Table 7.

TABLE 6

| | Cathode | Anode | Additive | Amount added wt % | Electrolyte composition (non-aqueous solvent volume ratio) | Initial discharge relative capacity | 50 cycle discharge capacity retention rate % |
|---|---|---|---|---|---|---|---|
| Ex. 22 | $LiCoO_2$ | Natural graphite | Lithium benzene-thiolate | 0.20 | 1M $LiPF_6$ EC/PC/MEC = 1/1/4 | 1.08 | 91.3 |
| Comp. Ex. 6 | $LiCoO_2$ | Natural graphite | None | 0.0 | 1M $LiPF_6$ EC/PC/MEC = 1/1/4 | 1 | 81.4 |

TABLE 7

| | Cathode | Anode | Additive | Amount added wt % | Electrolyte composition (non-aqueous solvent volume ratio) | Initial discharge relative capacity | 50 cycle discharge capacity retention rate % |
|---|---|---|---|---|---|---|---|
| Ex. 23 | $LiCoO_2$ | Natural graphite | Lithium benzene-thiolate | 0.20 | 1M $LiPF_6$ EC/DMC/DEC = 1/1/1 | 1.08 | 92.1 |
| Comp. Ex. 7 | $LiCoO_2$ | Natural graphite | None | 0 | 1M $LiPF_6$ EC/DMC/DEC = 1/1/1 | 1 | 83.0 |

Example 23

The same procedure was followed as in Example 12, except for using EC/DMC/DEC (volume ratio)=1/1/1 instead of EC/DMC (volume ratio)=1/2 as the non-aqueous solvent, to prepare an electrolyte and fabricate a coin battery and to measure the battery characteristics. The initial discharge capacity was compared with the case of the same electrode configuration but with use of EC/DMC/DEC (volume ratio)=1/1/1 not given a thiol salt and having $LiPF_6$ dissolved therein to a concentration of 1M (Comparative Example 7) and calculated as a relative capacity of the same, whereby 1.08 was obtained. An increase of the discharge capacity of 8% compared with the case of Comparative Note that the present invention is not limited to the above Examples and includes various combinations easily deduced from the gist of the invention. In particular, the invention is not limited to the combinations of the solvents of the Examples. Further, the above Examples related to coin batteries, but the present invention may also be applied to cylindrical batteries and to prismatic batteries.

As is clear from the above Examples according to the present invention, it is possible to provide a lithium secondary battery superior in cycle characteristics and capacity in a broad temperature range and further storage characteristics and other battery characteristics.

What is claimed is:

1. A lithium secondary battery electrolyte comprising a non-aqueous solvent and a lithium salt dissolved therein, said electrolyte containing at least one compound having the formula (I):

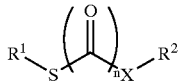
(I)

wherein, $R^1$ and $R^2$ independently indicate, a $C_1$ to $C_{12}$ alkyl group, a $C_3$ to $C_6$ cycloalkyl group, or an aryl group, X indicates an oxygen atom or a sulfur atom, and n indicates an integer of 1 or 2.

2. A lithium secondary battery electrolyte as claimed in claim 1, wherein the amount of the compound having the formula (I) is 0.01–10% by weight, based upon the total weight of the electrolyte.

3. A lithium secondary battery comprising a cathode, an anode, and an electrolyte comprising a non-aqueous solvent and a lithium salt dissolved therein, said electrolyte containing at least one compound having the formula (I):

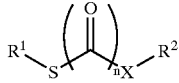
(I)

wherein, $R^1$ and $R^2$ independently indicate, a $C_1$ to $C_{12}$ alkyl group, a $C_3$ to $C_6$ cycloalkyl group, or an aryl group, wherein X indicates an oxygen atom or a sulfur atom, and n indicates an integer of 1 or 2.

4. A lithium secondary battery as claimed in claim 3, wherein the amount of the compound having the formula (I) is 0.01–10% by weight, based upon the total weight of the electrolyte.

5. A lithium secondary battery electrolyte comprising a non-aqueous solvent and a lithium salt dissolved therein, said electrolyte containing 0.01–10% by weight, based upon the total weight of the electrolyte, of at least one thiol salt having the formula (II):

wherein, $R^3$ indicates a $C_1$ to $C_{15}$ alkyl group or a $C_3$ to $C_{12}$ cycloalkyl group which may be substituted with at least one $C_1$ to $C_4$ alkyl group, a $C_7$ to $C_{15}$ benzyl group which may be substituted with at least one $C_1$ to $C_4$ alkyl group, or a $C_6$ to $C_{15}$ aryl group, which may be substituted with at least one $C_1$ to $C_4$ alkyl group, M indicates an alkali metal, and $R^3$ may be substituted with at least one halogen atom.

6. A lithium secondary battery electrolyte as claimed in claim 5, wherein the amount of the compound having the formula (II) is 0.05–5% weight, based upon the total weight of the electrolyte.

7. A lithium secondary battery comprising a cathode, an anode, and an electrolyte comprising a non-aqueous solvent and a lithium salt dissolved therein, said electrolyte containing 0.01–10% by weight, based upon the total weight of the electrolyte, of at least one thiol salt having the formula (II):

wherein, $R^3$ indicates a $C_1$ to $C_{15}$ alkyl group or a $C_3$ to $C_{12}$ cycloalkyl group which may be substituted with at least one $C_1$ to $C_4$ alkyl group, a $C_7$ to $C_{15}$ benzyl group which may be substituted with at least one $C_1$ to $C_4$ alkyl group, or a $C_6$ to $C_{15}$ aryl group, which may be substituted with at least one $C_1$ to $C_4$ alkyl group, M indicates an alkali metal, and $R^3$ may be substituted with at least one halogen atom.

8. A lithium secondary battery as claimed in claim 7, wherein the amount of the compound having the formula (II) is 0.05–5% by weight, based upon the total weight of the electrolyte.

* * * * *